United States Patent [19]

Harmon

[11] 4,263,822
[45] Apr. 28, 1981

[54] MULTIRANGE TRANSMISSIONS

[75] Inventor: Kenneth B. Harmon, Carmel, Ind.

[73] Assignee: General Motors Corporation, Detroit, Mich.

[21] Appl. No.: 4,692

[22] Filed: Jan. 19, 1979

[51] Int. Cl.³ .............................................. F16H 47/00
[52] U.S. Cl. ........................................ 74/645; 74/733; 74/731; 74/752 C; 74/753; 74/861; 74/862
[58] Field of Search ............... 74/645, 861, 731, 862, 74/733, 732, 752 C

[56] References Cited

U.S. PATENT DOCUMENTS

| | | | |
|---|---|---|---|
| 2,890,601 | 6/1959 | Forster | 74/732 X |
| 2,894,415 | 7/1959 | Miller | 74/732 X |
| 3,025,723 | 3/1962 | Miller | 74/732 |
| 3,096,666 | 7/1963 | Christenson et al. | 74/645 |
| 3,610,071 | 10/1971 | Tuck | 74/759 |
| 3,659,481 | 5/1972 | Espenchied et al. | 74/731 |
| 3,691,872 | 9/1972 | Schaefer | 74/864 |
| 3,691,872 | 9/1972 | Schaefer et al. | 74/731 X |
| 3,705,521 | 12/1972 | Smith | 74/759 |
| 3,791,239 | 2/1974 | Schreiner | 74/731 X |
| 3,818,783 | 6/1974 | Norris et al. | 74/869 |
| 3,861,241 | 1/1975 | Hancock | 74/733 |
| 3,905,252 | 9/1975 | Zaiser | 74/759 |
| 3,946,622 | 3/1976 | Murakami | 74/765 |
| 4,046,031 | 9/1977 | Ott et al. | 74/764 |
| 4,070,927 | 1/1978 | Polak | 74/765 |
| 4,122,732 | 10/1978 | Chana | 74/861 |

OTHER PUBLICATIONS

HT 700D Series Service Manual, Allison Transmissions, 1976, General Motors Corp.

*Primary Examiner*—Leslie Braun
*Attorney, Agent, or Firm*—A. M. Heiter

[57] ABSTRACT

A transmission having a torque converter, lockup clutch, and a 5-speed planetary transmission having four planetary gearsets and six friction drive-establishing devices combined to provide five forward speed range drives having a large total gear ratio step, and a reverse drive having a moderate and a high gear ratio. The 1st or primary gearset, with the primary input to the sun gear, the ring gear braked, and carrier output, provides 1st range drive having the largest torque multiplication gear ratio. The 2nd, 3rd and 4th gearsets, the secondary gearsets, are used to provide a secondary input having decreasing torque multiplication gear ratios, to the ring gear of the 1st gearset which, with the primary input to the sun gear, provides 2nd through 5th range drives having decreasing gear ratios. The gear ratio steps between 1st, 2nd, and 3rd ranges are wide, and between 3rd, 4th, and 5th ranges are very close. The automatic controls provide torque converter drive in a portion or all of 1st and 2nd range drives and in a portion of 3rd range drive up to a transition output speed, and lockup drive above the transition output speed in 3rd range drive and all of 4th and 5th range drives, to maintain engine speed within a small engine working speed range between the peak torque speed and maximum governed speed.

3 Claims, 5 Drawing Figures

MULTIRANGE TRANSMISSIONS

FIELD OF THE INVENTION

This invention relates to multirange transmissions and particularly multirange transmissions having a torque converter, a lockup clutch, a gear unit and controls therefor, and particularly multiratio planetary gearing.

BACKGROUND OF THE INVENTION

This invention is an improvement over the transmission gearing shown and described in U.S. Pat. No. 3,610,071 Tuck, dated Oct. 5, 1971, which shows planetary gearing having 4 gearsets combined to provide 5 range drives with substantially equal ratio steps. This transmission gearing and control system combination is an improvement over the following transmissions: A transmission having a forward and reverse manual valve, 5-speed automatic range controls responsive to output speed and torque demand and a lockup clutch control by input governor is shown in Foldout 5 or *HT 700D Series Service Manual* (SA 1270E; revised Mar. 1, 1976), by Detroit Diesel Allison Division of General Motors Corporation; a 5-speed transmission with manual valve selection of forward and reverse, 4-speed automatic range shift control by output speed and torque demand and lockup control by input governor is shown in U.S. Pat. No. 3,691,872 Schaefer et al granted Sept. 19, 1972. A 4-speed transmission with manual selection of forward and reverse, 4 speed forward and 2 speed reverse automatic control and lockup control by output speed is shown in U.S. Pat. No. 3,861,241 Hancock granted Jan. 21, 1975. The above transmission controls have a throttle modulator valve providing a torque demand modulated pressure inversely proportional to torque demand.

SUMMARY OF THE INVENTION

This invention is shown in a 5-speed transmission having, between the input and output, 5 forward range drives or ratio drives, referred to as 1st to 5th range drives and numbered in the order of increasing speed ratio or decreasing gear ratio. The gear ratio or torque ratio (which is output torque divided by input torque and is the reciprocal of the speed ratio in gearing) is the highest, providing maximum torque multiplication in 1st forward range drive and progressively decreases in 2nd, 3rd, and 4th forward range drives to 1 or 1:1 in 5th forward range drive. All the illustrative speed values herein are revolutions per minute, R.P.M. In the forward range drives, 1st, 2nd, and 3rd are the lower range drives and the 3rd, 4th, and 5th are the higher range drives. The 3rd or transition range drive may be included in both groups. The gear ratio steps are the ratio of the lower numbered range drive gear ratio, which has the higher numerical value, divided by the next higher numbered range drive gear ratio, which has a lower numerical value, such as: 1st gear ratio divided by 2nd gear ratio is the 1—2 ratio step.

This invention provides improved multirange planetary gearing having close ratio steps between the higher range drives, especially for use with a low-speed engine having a small engine working speed range between the peak torque speed and the maximum governed speed. The improved gearing, with close ratio steps between the higher range drives, provides improved shifting, especially automatic speed and torque-responsive shifting, to hold the engine speed within the small engine working speed range during full throttle operation to avoid engine lugging and extended operation at speeds less than the peak torque speed.

The improved transmission includes the improved planetary gearing, a fluid torque converter, and a lockup clutch. The torque converter and lockup clutch are arranged for parallel drive, so engagement of the lockup clutch for lockup clutch drive disestablishes the torque converter drive. The torque converter has a torque capacity matching engine torque and especially having a torque capacity, at a torque converter input speed or engine speed equal to engine peak torque speed, substantially equal to engine peak torque at full throttle, so during full throttle and full load operation, the torque converter permits engine speed to rise to peak torque speed and can stall the engine at peak torque speed and thus can deliver engine peak torque to the planetary gearing and load. The lockup clutch is disengaged to provide torque converter drive in part or all of the planetary gearing drives in the low ranges, 1st and 2nd, and the lower output speed portion of the transition range, 3rd, to provide during full throttle operation high torque multiplication and a large total ratio step due to the torque multiplication of the torque converter and gear ratios with wide steps to provide engine speed within the small engine working speed range.

In one arrangement, the lockup clutch is engaged in response to torque converter output or planetary gearing input speed, such as intermediate shaft speed, to provide only in the lower output speed portion of each lower range drive, 1st, 2nd, and 3rd, torque converter drive, and then lockup clutch drive in the higher output speed portion of 3rd and throughout 4th and 5th range drives. In another arrangement, the lockup clutch is engaged in response to planetary gearing output speed to provide full-time torque converter drive in the low ranges, 1st and 2nd, and in the transition range, 3rd, up to a transition output speed, and lockup clutch drive above the transition output speed in 3rd range and throughout 4th and 5th ranges. In both arrangements, engine speed is held within the engine working speed range for optimum performance and economy and after engagement of the lockup clutch at the transition speed in the transition range, 3rd, the lockup clutch remains engaged during 4th and 5th range drives for improved efficiency during road-load operation. Below the transition speed, the one arrangement provides further improved performance and economy, while the other arrangement provides improved shift quality.

The combination of this torque converter with a torque capacity substantially equal to peak engine torque at peak torque speed of the engine, and this planetary gearing with wide ratio steps between the lower range drives and very close ratio steps between the higher range drives, provides a full throttle maximum torque drive maintaining engine speed in the small engine working speed range between peak torque engine speed and maximum engine speed in all range drives to the load. The wide ratio steps are provided from the lowest gear range drive to the transition gear range drive, and the close ratio steps from the transition gear range drive to the highest gear range drive. The lower gear range drives, 1st, 2nd, and 3rd, used to meet high load torque requirements at lower road speeds, as vehicles require for starting and steeper grades at lower vehicle speeds, employ the torque converter in combination with higher gear ratios for high torque multiplication and smooth shifting through the wide ratio steps between these lower gear range drives. The higher gear range drives, 3rd, 4th, and 5th, are used to meet normal loads, as vehicles require for normal road-load operation at high vehicle speeds, employ the lockup clutch in combination with higher gear ratios for lower torque multiplication for best economy. The 3rd range drive may be included in both the lower and higher range drives because it is a transition range drive used with torque converter drive after a 2–3 shift and changing to lockup clutch drive during 3rd range drive. Since engagement of the lockup clutch or an upshift between ratios causes an engine speed reduction from near-maximum engine speed to near-peak torque engine speed, there is at full throttle an increase of engine torque to near-peak torque, so the power delivered to drive the load is substantially constant.

The improved planetary gear has four planetary gearsets and six drive-establishing devices operative to provide 5 forward range drives with wide ratio steps between the lower forward range drives and close ratio steps between the higher forward range drives and a reverse drive. The gearing has a 1st, primary, or combining gearset and secondary gearsets, preferably 3, which are selectively used to provide a plurality of secondary input ratio drives, preferably 4, with progressively decreasing gear ratios. A primary input drive is selectively combined with each secondary input drive in the combining gearset to provide a transmission having 5 forward range drives having progressively decreasing gear ratios. The 5 forward range drives having increasing speed ratios and decreasing torque ratios with a 1st range drive providing high torque multiplication drive, and a 5th range 1:1 drive with wide ratio steps between the lower range drives, very close ratio steps between the higher range drives, and a large total ratio step between the 1st and 5th range drives. In the planetary gearing, a forward clutch is engaged for a primary input drive to the 1st or combining gearset which has a reaction member held for 1st range drive, and for a secondary input drive to the other or secondary gearsets having ratio control devices selectively operated for decreasing gear ratio drives, to the reaction member of the combining gearset to provide 2nd, 3rd, 4th, and 5th range drives. In 2nd range drive, the secondary gearsets provide a torque multiplication gear ratio secondary input drive to the combining 1st gearset to provide a wide ratio step between 1st and 2nd range drives. In 3nd range drive, the secondary gearsets provide a gear ratio, decreased by a wide ratio step, to the combining 1st gearset for a wide ratio step between the 2nd and 3rd range drives. In 4th and 5th range drives, the secondary gearsets provide gear ratios, decreasing by close ratio steps, to the combining 1st gearset for close ratio steps between 3rd, 4th, and 5th range drives. This gearing also provides a preferred moderate ratio 1st reverse drive and a high ratio 2nd reverse drive.

In all forward range drives, the forward clutch provides a primary input drive to the sun gears of the 1st and 2nd gearsets and the ring gear of the 3rd gearset. In all range drives the carrier of the 1st gearset provides the output drive. The reaction ring gear of the 1st gearset is held for 1st range drive. The 2nd, 3rd, and 4th gearsets provide the secondary input drives to the ring gear to the 1st gearset for all higher range drives. The ring gear of the 2nd gearset is held for torque multiplication drive by the carrier to the ring gear of the 1st gearset for combined drive in the 1st gearset for 2nd range drive. The carrier of the 4th gearset is held for a combined torque multiplication drive by the 3rd and 4th gearsets connected to the ring gear of the 2nd gearset for a combined torque multiplication drive of all gearsets to the ring gear of the 1st gearset for 3rd range drive. The sun gear of the 3rd gearset is held for a combined torque multiplication drive by the 2nd and 3rd gearsets to the ring gear of the 1st gearset for 4th range drive. A 5th clutch provides input drive to the sun gears of the 3rd and 4th gearsets to lock up the gearing for 1:1 drive. In 2nd to 5th range drives, the load is shared by the sun gears of the 1st and 2nd gearsets, so the load on the highest loaded gear, the sun gear of the 1st gearset, is about 60% of the total load. The close ratio steps between 3rd, 4th, and 5th range drives are 17% ratio steps. The wide ratio steps between 1st, 2nd, and 3rd range drives are more than 50% ratio steps. The 2nd brake and 5th clutch are engaged for a moderate ratio 1st reverse drive.

These and other features of the present invention will be more apparent from the following description and the accompanying drawings.

DESCRIPTION OF THE PREFERRED EMBODIMENTS

Figure 1:
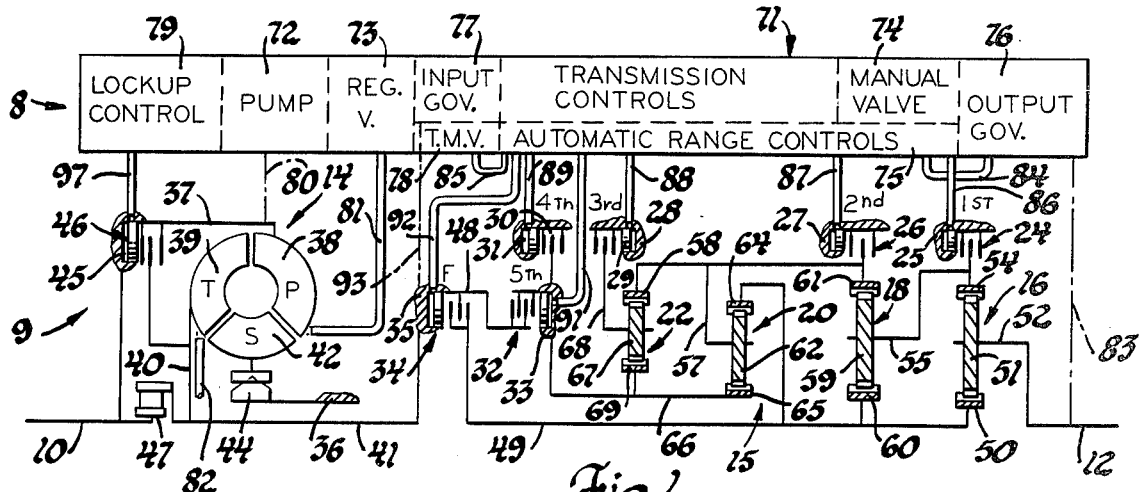
FIG. 1 is a schematic view of the transmission gearing and controls.
Figure 4:
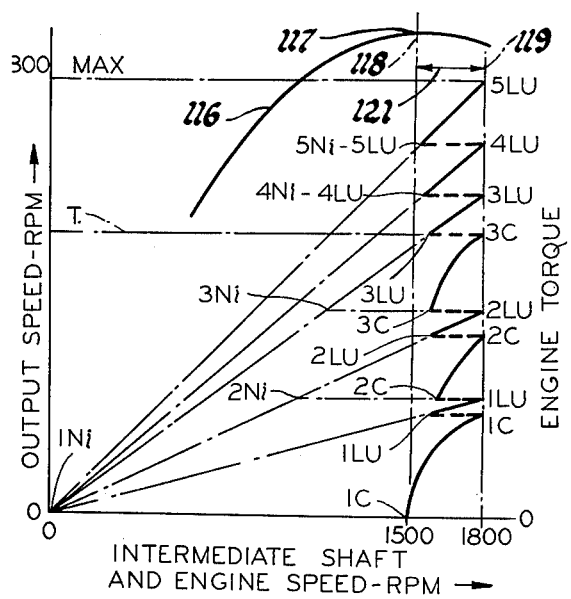
FIG. 4 shows the engine torque curve, range drive and shift curves and other related curves for one sequence of drive change operation at full-throttle provided by the FIG. 2 lockup control.
Figure 5:
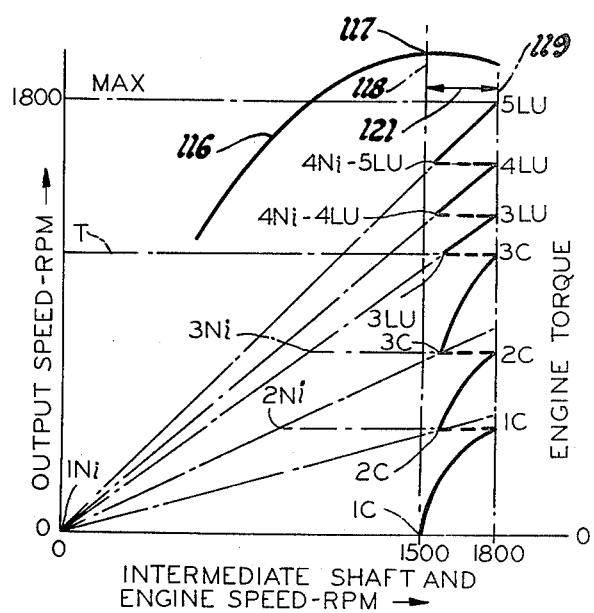
FIG. 5 shows the engine torque curve, range drive and shift curves and other related curves for a modified sequence of drive change operation at full-throttle provided by the FIG. 3 lockup control.

Referring to the drawings, in FIG. 1 there is shown a vehicular transmission 8 generally comprising a drive train 9 and transmission controls 71. This transmission 8 is especially suitable for drive by a known low-speed engine (not shown) having a small working speed range (e.g., 1500 to 1800 RPM) between the peak torque engine speed providing peak or maximum engine torque and the maximum engine speed providing slightly lower engine torque during full-throttle operation, as shown by torque Curve 116 (FIGS. 4 and 5). The components of transmission drive train 9 are suitably supported in the transmission housing, designated generally as 36.

Transmission drive train 9 has, connecting transmission input shaft 10 to transmission output shaft 12, a fluid or hydrodynamic torque converter 14 and a lockup clutch 46, in parallel drive arrangement, for selectively providing fluid torque converter drive or lockup clutch drive to the planetary gearing 15 which selectively provides five forward range drives and two reverse drives. The planetary gearing 15 has 4 planetary gearsets 16, 18, 20, and 22; and 6 friction drive-establishing devices, which are 1st, 2nd, 3rd, and 4th range brakes 24, 26, 28, 30, and 5th range and forward clutches 32 and 34, respectively including 1st to 5th range fluid motors 25, 27, 39, 31, and 33, and forward fluid motor 35. Conventional friction plate-type clutches and brakes are used. Each fluid motor has a piston in a cylinder (not shown) and operates in response to the supply of apply fluid pressure to the cylinder of the fluid motor to apply the associated brake or clutch. Each brake and clutch has a known retraction spring (not shown) to release its brake or clutch on exhaust of its apply pressure from its fluid motor. All of these components are suitably located and supported in the transmission housing 36, with input shaft 10 being adapted for connection to an engine and output shaft 12 being adapted for connection by a final drive to vehicle driving wheels. The four gearsets and six friction drive-establishing devices offer at least 5 forward range drives and 2 reverse drives.

Power input to transmission 8 is delivered by input shaft 10 to torque converter housing 37 which drives converter pump P having blades 38. Converter pump P pumps fluid to converter turbine T having blades 39. Turbine T is drive connected by a hub 40 to intermediate shaft 41, which is the output shaft of torque converter 14 and input shaft of gearing 15. Fluid leaving turbine T is redirected to pump P by stator S having blades 42. Stator S is connected by a one-way brake 44 to transmission housing 36. Torque converter 14 is a conventional three-element type which multiplies torque, with the torque gradually decreasing from stall with increasing engine speed until the turbine speed increases to a speed close to pump speed. At this point, which is called the "coupling" speed, there is no reaction on the stator and the stator is free to rotate in the forward direction, the same rotational direction as the pump and turbine. One-way brake 44 prevents only reverse rotation of the stator during torque multiplication. Torque converter 14 has a high speed ratio (e.g., 0.89) at full load and governed engine speed, and a torque capacity matching engine torque and especially providing a torque capacity substantially equal to engine maximum or peak torque at torque converter input speed equal to peak torque speed, so that at full load the torque converter will permit the engine speed at full-throttle to increase to peak torque engine speed and at peak torque engine speed, the torque converter 14 has the torque capacity to stall the engine and thus to deliver multiplied maximum or peak engine torque to intermediate shaft 41. Converter 14 further includes a conventional friction plate lockup clutch 46 which has a known lockup fluid motor 45 like the above range fluid motors. On the supply of lockup fluid pressure to lockup fluid motor 45, lockup clutch 46 is engaged and connects converter housing 37 to hub 40 to thus provide a direct mechanical drive between input shaft 10 and intermediate shaft 41, which drive bypasses the hydraulic power path through converter 14. When lockup fluid pressure is exhausted from lockup fluid motor 45, the fluid pressure in torque converter housing 37, or a retraction spring (not shown), releases lockup clutch 46. A one-way or free-wheeling clutch 47 is connected between input shaft 10 and intermediate shaft 41 to provide overrun drive. During overrun or coasting there is drive from output shaft 12 through gearing 15 to intermediate shaft 41, so one-way clutch 47 provides direct drive to input shaft 10 for improved or increased engine braking capability and to make modulation of lockup clutch pressure for lockup clutch engagement less critical at low speeds for smooth engagement. When the engine drives input shaft 10 for drive by torque converter 14 or lockup clutch 46, one-way clutch 47 overruns or is inactive.

Power input to transmission gearing 15 is provided by intermediate shaft 41 which is drive connected to a drum 48. Drum 48 is selectively connected by engagement of forward drive-establishing device or clutch 34 to drive shaft 49. Shaft 49 is connected to sun gear 50 of 1st gearset 16. Sun gear 50 meshes with pinions 51 carried by carrier 52 which is connected to transmission output shaft 12. Pinions 51 also mesh with ring gear 54 which may be held by engagement of 1st friction drive-establishing device or brake 24. Ring gear 54 of 1st gearset 16 is connected to carrier 55 of 2nd gearset 18. Pinions 59 of 2nd gearset 18 are carried by carrier 55 and mesh with sun gear 60 which is connected to drive shaft 49. Pinions 59 also mesh with ring gear 61 which may be held by engagement of 2nd drive-establishing device or brake 26. Ring gear 61 of 2nd gearset 18 is connected to carrier 57 of 3rd gearset 20 and ring gear 58 of 4th gearset 22. Pinions 62 of 3rd gearset 20 are carried by carrier 57 and mesh with ring gear 64 which is connected to shaft 49. Pinions 62 also mesh with sun gear 65 which is connected to a sleeve 66 through which shaft 49 extends. Ring gear 58 of 4th gearset 22 meshes with pinions 67 carried by carrier 68 which may be held by engagement of 3rd drive-establishing device or brake 28. Pinions 67 also mesh with sun gear 69 which is connected to sleeve shaft 66. Sleeve shaft 66, and thus sun gears 65 and 69, may be held by engagement of 4th drive-establishing device or brake 30. Both sun gears 65 and 69 may also be connected by sleeve shaft 66 to intermediate shaft 41 by engagement of 5th drive-establishing device or clutch 32.

The gearing 15 is controlled by the transmission controls 71 which supply fluid pressure through the apply lines to the motors for engaging the clutches and brakes in the operational sequence indicated by "X" in TABLE I below. The clutches, brakes, motors, and apply lines are identified by their reference numerals. TABLE I also shows the preferred gear ratios and ratio steps obtained by using the preferred number of teeth (TABLE II) on the sun and ring gears.

TABLE I

| Drive Ranges and Shifts | Motor Apply Lines | ENGAGED | | | | | | Gear Ratios | Gear Steps | % Ratio Step |
|---|---|---|---|---|---|---|---|---|---|---|
| | | CLUTCHES | | BRAKES | | | | | | |
| | | F'd. 34 35 92 | 5th 32 33 91 | 4th 30 31 89 | 3rd 28 29 88 | 2nd 26 27 87 | 1st 24 25 86 | | | |
| 1st | | X | | | | | X | 3.6923 | | |
| 1-2 | | | | | | | | | 1.7292 | 73% |
| 2nd | | X | | | | X | | 2.1353 | | |
| 2-3 | | | | | | | | | 1.5619 | 56% |
| 3rd | | X | | | X | | | 1.3671 | | |
| 3-4 | | | | | | | | | 1.1659 | 17% |
| 4th | | X | | X | | | | 1.1726 | | |
| 4-5 | | | | | | | | | 1.1726 | 17% |

TABLE I-continued

| Drive Ranges and Shifts | Motor Apply Lines | ENGAGED CLUTCHES | | ENGAGED BRAKES | | | | | |
|---|---|---|---|---|---|---|---|---|---|
| | | F'd. 34 35 92 | 5th 32 33 91 | 4th 30 31 89 | 3rd 28 29 88 | 2nd 26 27 87 | 1st 24 25 86 | Gear Ratios | Gear Steps | % Ratio Step |
| 5th | | X | X | | | | | 1.0 | | |
| Neut. | | | | | | | X | | | |
| 1-Rev. | | | X | | | X | | −5.5794 | | |
| 2-Rev. | | | X | | | | X | −9.6476 | | |

Transmission controls 71 of the automatic speed-responsive type are employed to provide this operational sequence for establishing the range and reverse drives and also for engagement of the lockup clutch 46. Transmission controls 71 are basically known, as pointed out above under "Background of the Invention", and thus basically shown schematically in FIG. 1 and briefly described below, and include a first and a modified lockup control 79, 79′, shown in FIGS. 2 and 3, and described below with regard to the new control concepts. Transmission controls 71 have a known pump 72, regulator valve 73, manual valve 74, automatic range controls 75, output governor 76, input governor 77, throttle modulator valve [T.M.V.] 78, and improved lockup control 79. Pump 72 is driven by pump drive 80 from torque converter housing 37 at input speed to deliver fluid under pressure to regulator valve 73 which regulates and supplies mainline pressure to manual valve 74, automatic range controls 75, throttle modulator valve 78, and lockup control 79, and overage to converter inlet line 81 to supply fluid to torque converter 14 which has converter outlet line 82 connected to the lubrication system (not shown). Output governor 76 driven by output shaft 12 by output governor drive 83 provides output governor pressure proportional to output speed in output governor line 84 connected to automatic range controls 75 and to modified lockup valve 96′ (FIG. 3) described below.

Throttle modulator valve 78 supplies throttle modulator pressure inversely proportional to torque demand to throttle modulator line 85 connected to automatic range controls 75 and, as described below, to lockup control 79. In the transmission controls 71, with manual valve 74 in the forward automatic position, the automatic range controls 75 function in an automatic forward mode in response to output governor pressure in output governor line 84 and torque demand or throttle modulator pressure in throttle modulator line 85 to selectively supply mainline pressure to establish 1st to 5th forward range drives.

As indicated by "X" in above TABLE I, automatic range controls 75 supply mainline pressure through 1st to 5th and forward apply lines 86, 87, 88, 89, 91, and 92 to 1st to 5th and forward fluid motors 25, 27, 29, 31, 33, and 35 to engage 1st to 4th brakes 24, 26, 28, 30, and 5th and forward clutches 32 and 34, to establish 1st to 5th forward range drives. Manual valve 74 manually establishes 1st and 2nd reverse drives, as indicated by "X" in TABLE I. Input governor 77 is connected by input governor drive 93 to intermediate shaft 41 and provides an input governor pressure signal proportional to the speed of intermediate shaft 41 in input governor line 94 (FIG. 2).

Figure 2:
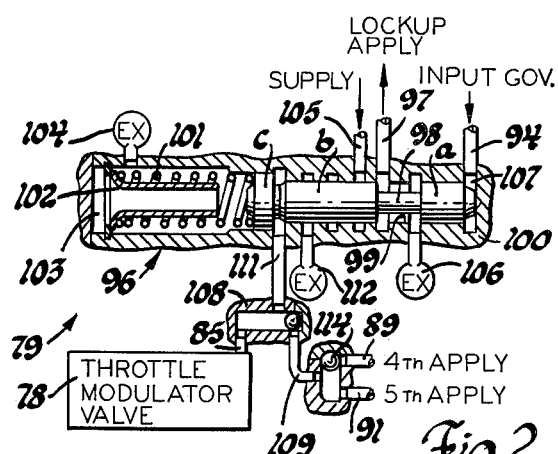
FIG. 2 shows a first or preferred embodiment of the lockup control for use in the controls of FIG. 1.

In a preferred arrangement for better transmission and engine or vehicle drive performance and economy, the lockup clutch control 79, shown in detail in FIG. 2, has a lockup valve 96 operating only in 1st, 2nd, and 3rd range drives in response to gearing input speed, to supply mainline pressure by lockup apply line 97 to lockup clutch motor 45 to engage lockup clutch 46 at a predetermined speed of intermediate shaft 41. Lockup valve 96 has a valve element 98 having lands a, b, and c of progressively larger diameters and located in a stepped bore 99 in valve body 100. A spring 101 is seated on a spring seat-and-valve stop member 102 secured to valve body 100, located in spring chamber 103 in one end of bore 99, and engages and biases valve element 98 to the closed position shown. Spring chamber 103 is vented by exhaust 104. Regulator valve 73 supplies mainline pressure to supply line 105. Valve element 98, in closed position, blocks supply line 105 and connects lockup apply line 97 to exhaust 106 to disengage lockup clutch 46 for drive by torque converter 14. Input governor line 94 supplies input governor pressure to the closed governor chamber 107 at the other end of bore 99 to act on the end area of land 98a to bias valve element 98 to the open position. Throttle modulator valve 78 supplies throttle modulated or torque demand pressure inversely proportional to torque demand via throttle modulator line 85 to a 1st shuttle valve 108. In the 1st, 2nd, and 3rd range drives, where 4–5 feed line 109 is exhausted, 1st shuttle valve 108 blocks 4–5 feed line 109 and connects throttle modulator line 85 to lockup signal line 111. Lockup signal line 111 is connected to bore 99 at the step between lands 98b and c to act on the unbalanced area of lands 98b and c to bias valve element 98 to the open position. When the sum of the input governor pressure bias force and torque demand bias force overcomes the bias force of spring 101, lockup valve 96 upshifts to block exhaust 106 and to connect mainline pressure supplied by supply line 105 to lockup apply line 97 to engage lockup clutch 46. Thus lockup valve 96 upshifts at predetermined speeds of intermediate shaft 41 increasing with increasing torque demand to the maximum lockup shift speed at full-throttle or torque demand. On such upshift, mainline pressure acts on the small unbalanced area between larger land 98b and smaller land 98a to provide a hysteresis or antioscillation force in an upshift direction, so lockup valve 96 downshifts at a lower speed than the speed at which it upshifts at the same throttle modulator pressure or torque demand. An exhaust 112 vents bore 99 between supply line 105 and lockup signal line 111. The respective 4th and 5th apply lines 89 and 91 are connected to a 2nd shuttle valve 114 which selectively connects the one of the 4th and 5th apply lines under pressure to 4–5 feed line 109 and blocks the one of these apply lines which is exhausted to supply either 4th or 5th apply pressure (which is mainline pressure) to 4–5 feed line 109. Mainline pressure in 4–5 feed line 109, being higher than modulator pressure, acts in 1st shuttle valve 108 to block throttle modulator line 85 and connect 4–5 feed line 109 to lockup signal line 111 to upshift lockup valve 96 for engagement of lockup clutch 46 at all intermediate shaft 41 speeds in the 4th and 5th range drives for fulltime lockup clutch drive. Some automatic range controls, such as shown in the above HT 700D Series Service Manual, have a 4–5 feed line which could be connected to 1st shuttle valve 108 and would not require 2nd shuttle valve 114.

In 1st, 2nd, and 3rd range drives, lockup valve 96 is downshifted for converter drive until the speed of intermediate shaft 41 increases to a predetermined speed value, which increases with increasing torque demand, to upshift lockup valve 96 for lockup clutch drive. Thus torque converter drive is provided in a lower output speed portion and lockup clutch drive in a higher output speed portion of 1st, 2nd, and 3rd range drives, and at all output speeds in the 4th and 5th range drives. Lockup clutch drive output speed is a transition output speed (T, FIG. 4), since converter drive is largely provided below this speed and only lockup clutch drive is provided above this speed. Since 5th clutch apply line 91 has apply pressure in the reverse drives, lockup clutch drive is not provided in the reverse drives.

Figure 3:
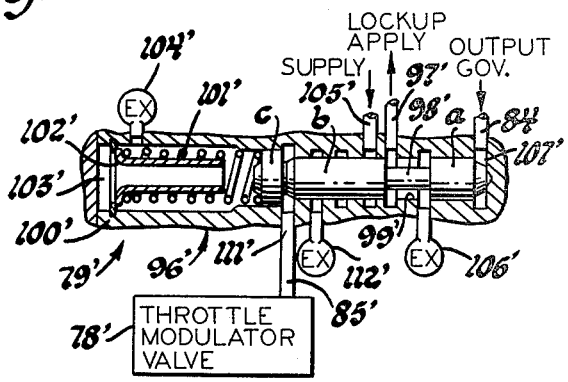
FIG. 3 shows a second or modified lockup control for use in the controls of FIG. 1.

In an arrangement preferred for simplicity of the control system and ease of providing good shift quality, the modified lockup control 79' (FIG. 3) operates in response to output governor pressure in output governor line 84 provided by output governor 76 to engage lockup clutch 46 at a predetermined speed of the output shaft 12. The modified lockup control 79' of FIG. 3 is similar to lockup control 79 of FIG. 2, so like reference numerals (primed) are shown in FIG. 3 and reference is made to the above description of lockup control 79 for similar features, and the different features are described hereinafter.

Lockup control 79' is controlled by the speed of output shaft 12, so output governor line 84 of output governor 76 is connected to closed governor chamber 107' to upshift lockup valve 96' in response to a predetermined output shaft 12 speed which increases with increasing torque demand. Throttle modulator line 85' is directly connected to lockup signal line 111' for throttle modulator pressure and output governor pressure control at all times to provide torque converter drive up to a predetermined output shaft speed and lockup clutch drive at higher output shaft speeds. This predetermined output shaft speed is selected as a high output speed in the transition or 3rd speed range, so torque converter drive is used throughout the low speed ranges, 1st and 2nd, and in a low output speed portion of 3rd range, up to the transition output speed (T), and during 1-2 and 2-3 shifts having wide ratio steps; and lockup clutch drive is used above the transition output speed in the high speed portion of 3rd range and the high speed ranges, 4th and 5th, and during the 3-4 and 4-5 shifts.

Lockup clutch control 79, 79' (FIGS. 2, 3) may also have a known lockup cut-off control (not shown) to disengage lockup clutch 46 during each shift between lockup range drives by automatic range controls 75. One type lockup cut-off control arrangement, as shown in the above U.S. Pat. No. 3,691,872 Schaefer et al, would be used to feed the lockup valve supply line 105, 105' (FIGS. 2, 3) from the range apply lines through a series of time-delay shuttle valves to interrupt the feed to the lockup valve and ensure disengagement of the lockup clutch for the range engagement or shift time period.

OPERATION

As shown in TABLE I, in all forward range drives, forward friction drive-establishing device, clutch 34, is engaged. The 1st forward speed range provides the greatest torque multiplication available in this drive train 9 arrangement for high starting effort and occurs when both clutch 34 and 1st brake 24 are engaged. Then with intermediate shaft 41 being driven forwardly by torque converter 14 and thus providing a primary input drive to sun gear 50 of 1st gearset 16 and with ring gear 54 held by 1st brake 24, there is effected forward 1st range drive of carrier 52, and thus of output shaft 12, at a reduced speed relative to the speed of intermediate shaft 41. The 1st gearset 16 thus provides a simple planetary reduction gear ratio with its braked ring gear 54 providing reaction.

In the remaining 4 forward speed range drives, on shifting to higher ranges from 2nd to 5th range, 1st planetary gearset 16 continues to have its sun gear 50 driven forwardly at the speed of intermediate shaft 41 and, in addition, ring gear 54 is driven forwardly at progressively decreasing gear ratios and increasing speed by secondary input drives from the remaining 3 gearsets 18, 20, and 22, the secondary gearing. Thus, 1st gearset 16 acts as a power-combiner, or combining gearset, in all of the remaining range drives. To establish 2nd forward speed range drive, 1st brake 24 is disengaged and 2nd brake 26 is engaged while forward drive clutch 34 remains engaged. With ring gear 61 of 2nd gearset 18 thus held to provide reaction, and with the forwardly rotating sun gear 60 in this gearset, its carrier 55 is driven in the forward direction and with a high torque multiplication gear ratio and at a reduced speed relative to the speed of intermediate shaft 41 to provide a high gear ratio secondary input drive to ring gear 54 of 1st or combining gearset 16. Thus, ring gear 54 in 1st gearset 16 which is connected to carrier 55 of 2nd gearset 18, is driven by this secondary input in the forward direction with a high gear ratio and at a reduced speed relative to the speed of forwardly rotating sun gear 50 of 1st gearset 16. The forward speed component or secondary input of ring gear 54 adds to the primary input of sun gear 50 to drive carrier 52 and thus transmission output shaft 12 in a 2nd speed range drive providing a next lower gear ratio and a higher speed than that obtainable in 1st forward speed range drive by the compound action thus provided by 1st and 2nd gearsets 16 and 18.

The 3rd forward speed range drive is provided by disengaging 2nd brake 26 and engaging 3rd brake 28 while forward clutch 34 remains engaged. This effects a secondary input compound torque multiplication gear ratio drive in 3rd and 4th gearsets 20 and 22 between intermediate shaft 41 and ring gear 61 of 2nd gearset 18 for further compounded torque multiplying gear ratio in 2nd gearset 18 for drive by its carrier 55 connected to ring gear 54 of 1st gearset 16 to drive ring gear 54 in the forward direction and with a next lower gear ratio and in a speed range providing a higher speed than that made available in the 2nd forward speed range drive. Since sun gear 50 of combining 1st gearset 16 also continues to be driven in the forward direction, transmission output shaft 12 is thus driven in 3rd speed range drive having a next lower gear ratio and a higher speed than that obtainable in the 2nd forward speed range drive.

The 4th forward speed range drive is established by releasing 3rd brake 28 and engaging 4th brake 30 while forward clutch 34 remains engaged. Then 3rd gearset 20 provides a simple secondary input planetary reduction gear ratio drive between intermediate shaft 41 and carrier 57 connected to drive ring gear 61 for further compound drive in 2nd gearset 18 to its carrier 55 to provide a secondary input drive having a next lower gear ratio to ring gear 54 and, with the continued primary input forward drive of sun gear 50, continuing in 1st combining gearset 16, to drive output shaft 12 with a next lower gear ratio and in a speed range higher than that made available in 3rd forward speed range drive.

The 5th forward speed range drive is established by releasing 4th brake 30 and engaging 5th clutch 32 while forward clutch 34 remains engaged. With both clutches 34 and 32 engaged, all 4 planetary gearsets 16, 18, 20, and 22 are in a locked up condition. The primary input drive to sun gear 50, and also the secondary input drive because secondary gearsets 18, 20, and 22 are locked up, drive sun gear 50 and ring gear 54, thus providing a direct or 1:1 drive from intermediate shaft 41 to output shaft 12 to effect the highest speed of the transmission output in 5th range drive.

A 1st reverse drive is established by engaging 5th clutch 32 and 2nd brake 26. This effects a compound reverse reduction gear ratio drive in the respective 1st, 2nd, and 3rd gearsets (16, 18, 20) between intermediate shaft 41 and transmission output shaft 12 to provide a practical commercial reverse gear ratio for trucks. A 2nd and lower speed reverse drive providing greater torque multiplication or gear ratio is also available. The 2nd reverse drive is established by engaging 5th clutch 32 and 1st brake 24 whereby 3rd gearset 20 provides a reverse gear reduction between intermediate shaft 41 and sun gear 50 in 1st gearset 16, and 1st gearset 16 provides a simple planetary reduction gear drive to output shaft 12.

The operation thus far described, for both forward range and two reverse drives, illustrates sequential upshifting, and it will be understood that reversing the sequence of operation provides sequential downshifting. Sequential upshifting and downshifting between forward range drives and between reverse drives are accomplished by releasing only one drive-establishing device and engaging only one other drive-establishing device.

To illustrate the gear ratios and the steps between ratios which are made available in the range drives of the above-described transmission gearing arrangement, typical practical commercial gear sizes with the preferred number of gear teeth shown in TABLE II below, provide the improved gear ratios and ratio steps shown in TABLE I.

TABLE II

| GEARSETS | | SUN GEARS | | RING GEARS | |
|---|---|---|---|---|---|
| No. | Ref. No. | Ref. No. | Number Teeth | Ref. No. | Number Teeth |
| 1st | 16 | 50 | 26 | 54 | 70 |
| 2nd | 18 | 60 | 26 | 61 | 70 |
| 3rd | 20 | 65 | 31 | 64 | 81 |
| 4th | 22 | 69 | 48 | 58 | 80 |

The primary input drive to sun gear 50 of 1st gearset 16 in all forward range drives is a 1:1 gear ratio. The secondary input drive to ring gear 54 of 1st gearset 16 in 2nd range drive has a large torque multiplying secondary gear ratio having a value to provide a wide ratio step between the gear ratios of 1st and 2nd range drives. The secondary input drive in 3rd range drive has a next lower torque multiplying secondary gear ratio having a wide ratio step relative to the higher secondary gear ratio of the next lower or 2nd range drive. The secondary inputs in 4th and 5th range drives have progressively lower secondary gear ratios (1:1 in 5th range drive), with close secondary ratio steps relative to the secondary gear ratio of the next lower range drive.

Each ratio step is determined by dividing the succeeding higher range drive gear ratio into the immediately preceding lower range drive ratio. For example:

$$\frac{3.6923 \text{ (1st)}}{2.1353 \text{ (2nd)}} = 1.7292 \text{ (1-2 ratio step)}$$

The ratio step percent provides a convenient expression of ratio step values and is a lower gear ratio minus the next higher gear ratio multiplied by 100, divided by the next higher gear ratio, eq (1st gear ratio—2nd gear ratio) 100/2nd gear ratio)=1-2 ratio step %, or, (3.6923-2.1353) 100/2.1353=73% 1-2 ratio step, which simplified, is: the ratio step minus one (1), multiplied by 100 (ratio step-1) 100, eq (1.73-1) 100=73%, 1-2 ratio step. With these gear ratios, and provided that no available drive ratios are to be bypassed while accelerating the load in forward drive, the ratio steps and percent ratio steps (TABLE I) show the 1-2 and 2-3 steps are wide, 73% and 56% or over 50%. The 3-4 and 4-5 steps are close, 17% or 20% or less. The total ratio step is large, 3.69/1 or 3.69.

With such gear ratios and ratio step pattern in TABLE I above, this transmission gearing 15, in combination with torque converter 14 having a torque capacity equal to peak engine torque at peak engine torque speed and lockup clutch 46, is particularly suitable for use as a heavy truck transmission.

With low-speed engines, such as an engine governed at a maximum speed of 1800 RPM, for optimum performance and efficiency, this invention provides close ratio steps between the gear ratios of the high speed forward range drives continuously used in road-load driving to provide high efficiency and performance and to prevent excessive engine lugging at the downshift points of automatic transmissions shifting in response to speed and torque demand. In such low-speed engines, as shown by a typical engine torque curve 116 in FIGS. 4 and 5, the peak engine torque 117 remains at about the same high peak torque engine speed 118, despite the reduction of the top or maximum governed engine speed 119, so the engine has a smaller engine working speed range 121.

It is not proper to operate an engine for long periods at speeds below the peak torque speed. Thus for optimum engine performance, full power, maximum efficiency and optimum durability, engine should be operated in the small engine working speed range (e.g., 1500 to 1800 RPM). This transmission gearing 15 provides a high torque multiplication 1st gear range drive and wide ratio steps between the low gear range drives, 73% 1-2 ratio step and 56% 2-3 ratio step. The combined drive by torque converter 14 and gearing 15 provides, in the low gear range drives (1st and 2nd) and in a portion of the transition gear range drive (3rd) up to a transition output speed (e.g., 1170 RPM or about 65% of the maximum output speed), a combined drive having a very high torque multiplication ratio at stall, the torque converter stall torque ratio multiplied by the 1st gear ratio, e.g., about 9:1, a wide range of torque or gear ratio decreasing from a high value, e.g., 9:1, to a low value, e.g., 1.37:1. Under full-throttle and load driving conditions, the transmission gearing 15 and lockup clutch 46 are automatically shifted to maintain engine speed in the working speed range for starting and other occasionally encountered high torque drive requirements. The gearing 15, in the transition and high ranges (e.g., 3rd, 4th, and 5th) has low torque multiplication gear ratios, from 1.37:1, having very close ratio steps (e.g., 3–4 and 4–5 ratio steps of 17%), so that during high speed road-load operation with lockup clutch 46 engaged the transmission may be shifted by automatic range controls 75 and engine speed is maintained in the small engine working speed range. Gearing 15 has 17% 3-4 and 4-5 ratio steps, as compared to minimum obtainable 3-4 and 4-5 ratio steps of about 25% in the above U.S. Pat. No. 3,610,071 Tuck. Thus with an engine governed at 1800 RPM, the close 17% ratio step provides on a downshift not less than 1535 RPM engine speed which is within the small engine working speed range. Thus, with upshifts provided at or near maximum engine speed in the small working speed range, the engine speed reduction occurring during an upshift is small, so engine speed after an upshift remains within the small working speed range of the engine. Also, with downshifts provided near the minimum speed in the working speed range, the engine speed increase occurring during a downshift is small, so engine speed remains within the small working speed range of the engine.

The following detailed description of the forward drive automatic operation of these transmissions is directed to full-throttle and full load operating conditions which are critical because the throttle cannot be advanced to compensate for insufficient or lost torque and power and adverse engine operating conditions are more severe.

During full-throttle and load operation, lockup shifts in a gear range drive are made in response to a predetermined intermediate shaft 41 speed or output shaft 12 speed as the torque converter 14 at maximum engine speed approaches or is at maximum speed ratio (e.g., 0.89) and near 1:1 torque ratio. Engagement of lockup clutch 46 for lockup clutch drive at constant output shaft 12 speed makes intermediate shaft 41 speed equal to engine speed and reduces both speeds so the overall speed ratio (output speed divided by engine speed) equals the speed ratio of the gear drive and the overall torque ratio equals the torque ratio of the gear drive. Since the maximum converter drive output intermediate shaft 41 speed is 0.89 of the maximum lockup drive output speed in each range, the engine speed reduction (200) on a lockup shift is small, and is the slip, 0.11, times maximum engine speed, 1800 RPM. On a range shift at constant output shaft speed, the intermediate shaft speed will be reduced solely as a function of the gear ratio step to provide the speed ratio of the next higher range drive.

The operating principles of the FIGS. 1 and 2 arrangement having gearing 15 with the gear ratios in the above TABLE I, torque converter 14 with the above-described torque capacity, lockup clutch 46, and lockup control 79 (FIG. 2), are illustrated by the data in TABLE III on a specific example or calibration of speed values in RPM and change of speed values in RPM for full-throttle and full load operation of a highway vehicle. The TABLE III data was used to plot the shift cruves of FIG. 4. TABLE III shows the sequence of the drive modes and the lockup shifts and range shifts between successive drive modes of this arrangement and for an illustrative calibration, for each drive mode, the minimum and maximum engine speed (Ne), intermediate shaft 41 speed (Ni), and output speed (No). TABLE III also shows the change of engine speed (Δ Ne) for each drive mode and each shift and the change of output speed (Δ No) for each drive. Shifts are made at constant output speed so there is no significant change of output speed during a shift. In FIG. 4, the 1st to 5th gear ratio lines show the 1st to 5th gear ratios of gearing 15 relative to output speed and intermediate shaft speed.

TABLE III

| Drive Modes & Shifts | Ne Min. | Ne Max. | Δ Ne Drive & Shift | Ni Min. | Ni Max. | No Min. | No Max. | Δ No Drive |
|---|---|---|---|---|---|---|---|---|
| 1st Conv. | 1500 | 1800 | 300 | -0- | 1600 | -0- | 433 | 433 |
| LU Shift | | | 200 | | | | | |
| 1st LU | 1600 | 1800 | 200 | 1600 | 1800 | 433 | 487 | 54 |
| 1-2 Shift | | | 250 | | | | | |
| 2nd Conv. | 1550 | 1800 | 250 | 1040 | 1600 | 487 | 750 | 263 |
| LU Shift | | | 200 | | | | | |
| 2nd LU | 1600 | 1800 | 200 | 1600 | 1800 | 750 | 843 | 93 |
| 2-3 Shift | | | 250 | | | | | |
| 3rd Conv. | 1550 | 1800 | 250 | 1152 | 1600 | 843 | 1170 | 327 |
| LU Shift | | | 200 | | | | | |
| 3rd LU | 1600 | 1800 | 200 | 1600 | 1800 | 1170 | 1316 | 146 |
| 3-4 Shift | | | 257 | | | | | |
| 4th LU | 1543 | 1800 | 257 | 1543 | 1800 | 1316 | 1535 | 219 |
| 4-5 Shift | | | 265 | | | | | |
| 5th LU | 1535 | 1800 | 265 | 1535 | 1800 | 1535 | 1800 | 265 |

TABLE III shows that in each drive mode the engine speed (Ne) is maintained within the working speed range (e.g., 1500 to 1800 RPM) and that with progressively decreasing torque ratio drives—which are 1st gear range torque converter drive (1st Conv.), 1st gear range lockup clutch drive (1st LU), 2nd gear range torque converter drive (2nd Conv.), etc., to 4th and 5th gear range lockup clutch drives (4th LU, 5th LU)—the output shaft speed (No) is progressively increased from a minimum (0) to a maximum (1800) RPM.

The automatic range controls 75 operate in response to output governor pressure supplied by output governor 76 driven by output shaft 12 to provide range upshifts from each of the 1st to 4th range drives to the next higher range at progressively higher output speeds which increase with torque demand. At full-throttle the range upshifts occur at the maximum output speed (No) in each lockup (LU) drive: e.g., in 1st LU, at Max. No. 487, the 1-2 shift occurs, which corresponds with maximum (Ne) engine speed (e.g., 1800 RPM).

In the lockup control 79, lockup valve 96 is downshifted at all intermediate shaft 41 speeds as the speed increases up to lockup shift speed (e.g., 1600 RPM) in 1st, 2nd, and 3rd range drives to disengage lockup clutch 46 to provide 1st, 2nd, and 3rd range converter drives. Lockup valve 96 upshifts in response to input governor pressure supplied by input governor 77 driven by intermediate shaft 41 at the lockup shift speed (e.g., 1600 RPM) of intermediate shaft 41 to engage lockup clutch 46 for 1st, 2nd, and 3rd range lockup drives. Since lockup valve 96 has hysteresis, when lockup valve 96 is upshifted, the intermediate shaft 41 speed must decrease below the lockup shift speed by the hysteresis amount (e.g., 50 RPM) to a downshift speed (e.g., 1550 RPM) to downshift lockup valve 96 to disengage lockup clutch 46 for 1st, 2nd, and 3rd range converter drive. In 4th and 5th range drives, 4th or 5th range apply lines 89 or 91 supply pressure via lockup signal line 111 to hold lockup valve 96 in lockup position at all intermediate shaft 41 speeds, so lockup clutch 46 is engaged for lockup drive at all speeds in 4th and 5th range drives. In all lockup drives, 1st to 5th, engine speed (Ne), TABLE III, and intermediate shaft 41 speed (Ni) are the same: Ne=Ni, from minimum to maximum values, and each divided by the gear ratio equals the output speed (No), e.g., in 1st LU, Min. Ne and Ni are 1600, and 1600/3.6923=433. Thus, each lockup drive (e.g., 1LU—1LU, FIG. 4) is on its gear ratio line, e.g., 1st.

In all converter drive ranges, 1st to 3rd, at maximum engine speed where torque converter 14 has a torque ratio of 1 and a slip speed ratio of 0.89, the intermediate shaft 41 speed is the engine speed multiplied by the slip speed ratio (e.g., Ne Max. 1800×0.89=Ni Max. 1600). In all drives, intermediate shaft 41 speed (Ni) from minimum to maximum equals output speed (No) from minimum to maximum, (No) multiplied by the gear ratio: e.g., 1st Ni Max. 1600=1st No Max. 433×3.6923. Ni Max. in all converter drives is 1600 and in all lockup drives is 1800. Ni Min. in all lockup drives is equal to Ne Min. Ni Min. in 1st, 2nd, and 3rd converter drives respectively is 0 (zero), 1040, and 1152 (FIG. 4, 1Ni, 2Ni, and 3Ni, on 1st, 2nd, and 3rd gear ratio lines). Torque converter 14 has an increasing speed ratio during decreasing torque multiplication to provide the overall shift speed curves of FIG. 4.

When the output speed is in the 1st range drive output speed interval (No Min. 0, to Max. 487), in response to output governor 76 at full throttle, automatic range controls 75 provide 1st gear range drive by gearing 15. As engine speed increases from idle (e.g., 600) through peak torque speed (e.g., 1500) up to maximum engine speed (e.g., 1800 RPM), lockup control 79 disengages lockup clutch 46 to provide 1st torque converter drive (1st Conv., TABLE III, and Curve 1C—1C, FIG. 4). In lockup control 79, lockup valve 96 is controlled by input governor 77 at full-throttle and remains in downshift position as the speed of intermediate shaft 41 increases to the maximum speed in torque converter drive (e.g., 1600), which equals maximum engine speed multiplied by the torque converter speed ratio: e.g., 1800×0.89=1602 (or 1600). At full-throttle and full load, torque converter 14 will slip during stall permitting engine speed to increase to peak torque speed (e.g., 1500), providing maximum or peak engine torque; and torque converter 14, having a capacity equal to peak engine torque at an input speed equal to peak torque engine speed, provides a stall maximum torque multiplication in 1st converter drive to initiate drive at peak torque engine speed, the minimum engine drive speed (e.g., 1500) and minimum output speed (0, zero) for maximum torque multiplication in 1st converter drive at full-throttle and load. Then, with increasing engine and output speeds in 1st converter drive, the converter speed ratio increases from stall or zero to the maximum 0.89 and torque ratio decreases from a maximum (e.g., 2 to 3) to near 1:1, so the overall speed ratio increases from stall to near or 0.89 of the 1st gear ratio, and the overall torque ratio decreases from the product of maximum converter torque ratio and 1st gear ratio to near 1st gear ratio. At maximum engine speed (e.g., 1800) in response to lockup speed of intermediate shaft 41 (e.g., 1600), lockup valve 96 upshifts in response to input governor pressure to supply lockup pressure via lockup apply line 97 to engage lockup clutch 46 for the 1st Conv. to LU shift at constant output speed, e.g., 433, and reducing engine speed from 1800 to 1600 which is within the engine working speed range (TABLE III and line 1C-1LU, FIG. 4). In 1st lockup, the speed of the engine, input shaft 10 and intermediate shaft 41 are the same, e.g., 1600 to 1800. Since lockup valve 96 has hysteresis due to lockup apply pressure acting on the unbalanced area of valve element land 98b, a lockup downshift occurs only at a lower lockup downshift speed (e.g., 1550) which is lower than the lockup upshift speed (e.g., 1600) and minimum 1st converter drive intermediate shaft speed (e.g., 1600), so lockup valve 96 remains upshifted and lockup clutch 46 remains engaged. The lockup downshift speed also is lower than minimum engine and intermediate shaft speed in 1st, 2nd, and 3rd range lockup drives. On all lockup shifts, engagement of lockup clutch 46 increases the overall speed ratio and provides the overall gear ratio of the engaged range drive.

Then, in 1st lockup drive, engine and output speeds increase at constant 1st speed ratio and gear ratio from the minimum speed up to the maximum speed (TABLE III and line 1LU—1LU, a portion of the 1st gear ratio line, FIG. 4). At the predetermined output speed, e.g., 487, the automatic range controls 75 provide a 1-2 shift from 1st lockup drive to 2nd converter drive at constant 1-2 shift output speed, e.g., 487. If lockup clutch 46 remained engaged during this 1-2 shift, engine speed would be reduced with intermediate shaft 41 speed (Ni) which is reduced by the gear ratio 1-2 shift, to, e.g., 1040, 2Ni (FIG. 4). However, when the engine speed and intermediate shaft 41 speed are reduced to the lockup downshift speed (e.g., 1550), lockup valve 96 downshifts to disengage lockup clutch 46 to prevent further reduction of engine speed. So, during the 1-2 shift and in 2nd converter drive the minimum engine speed, e.g., 1550, is in the engine working speed range (TABLE III; lines 1LU-2C, 2C—2C, FIG. 4).

During this 1st lockup to 2nd converter drive range shift and other lockup to converter range shifts, torque converter 14 provides a decreased speed ratio to largely compensate for the increased gear speed ratio, so the overall speed ratio increase is small so engine speed is in the engine working speed range, and a torque ratio increase to initially provide in 2nd converter drive an intermediate overall torque ratio so the overall 1-2 torque ratio step is less than the gear ratio step. Torque converter 14, at the speed ratio provided by an input or engine speed of 1550 RPM and an output or intermediate shaft 41 speed of 1040 RPM, has the torque capacity to transmit full torque and has less capacity at lower input speeds so engine speed is not reduced below 1550 RPM.

Then 2nd converter and lockup drives similar to those in 1st are provided. As engine speed and output speed increase in 2nd converter drive, the torque converter 14 speed ratio increases from an intermediate value to the maximum, the slip speed ratio, e.g., 0.89, and the torque ratio decreases from an intermediate value to near 1:1, and the overall speed ratio increases from near 1st gear speed ratio to near or 0.89 of 2nd gear speed ratio, and the overall torque ratio decreases from the intermediate value to near the 2nd gear ratio.

Thus engine and output speeds increase to the maximum (TABLE III; Curve 2C—2C, FIG. 4). At maximum engine speed (e.g., 1800 RPM), the corresponding speed of intermediate shaft 41 (e.g., 1600 RPM), as described above, upshifts lockup value 96 to engage lockup clutch 46 for the 2nd lockup shift (Curve 2C-2LU, FIG. 4) for 2nd lockup drive (Curve 2LU—2LU) which is like the 1st lockup shift. At the maximum output speed (e.g. 843) in 2nd lockup drive, the automatic range controls 75 shift the gearing 15 to 3rd range and reduce engine speed and intermediate shaft 41 speed to 1550 RPM to downshift lockup valve 96 to disengage lockup clutch 46 for the 2—3 shift from 2nd lockup drive to 3rd converter drive (Curve 2LU-3C, FIG. 4) with a minimum engine speed of 1550 RPM which is in the engine working speed range. Though this 2-3 gear ratio shift further reduces intermediate shaft speed to, e.g. 1152 (3Ni, FIG. 4), the torque converter speed ratio decreases, so engine speed is not reduced below the minimum speed, similar to the above 1-2 shift.

Then 3rd converter and lockup drives similar to these drives in 1st and 2nd are provided, as shown in TABLE III and Curves 3C—3C and lines 3C-3LU, 3LU—3LU of FIG. 4. In 3rd converter drive, the torque converter and overall speed and torque ratios vary like in 2nd converter drive. At maximum output or transition speed (e.g., 1170), maximum engine speed (e.g., 1800) and lockup shift speed (e.g., 1600) of intermediate shaft 41, lockup valve 96 engages lockup clutch 46 for 3rd lockup shift (line 3C-3LU, FIG. 4) to 3rd lockup drive. This 3rd lockup shift is a transition shift at a transition shift point at transition output speed (T, FIG. 4), e.g., 1170, since below this transition shift point in 3rd or transition range drive and low range drives below 3rd range drive, torque converter drive is provided; and above this transition shift point in 3rd or transition range drive and high range drives above 3rd range drive, only lockup range drives are provided. Then in 3rd lockup drive at the maximum output speed (e.g., 1316 RPM), the automatic range controls 75 provide the 3-4 shift to 4th range drive (line 3LU-4LU, FIG. 4). As pointed out above, in 4th range drive the 4th apply pressure in line 89 positions lockup valve 96 in lockup position to engage lockup clutch 46 for 4th lockup drive (Curve 4LU—4LU) at all speeds.

At the maximum output speed (e.g., 1535 RPM) in 4th lockup drive, the automatic range controls 75 upshift, 4-5 shift, to provide the 5th apply pressure in line 91 to engage 5th range drive (line 4LU-5LU, FIG. 4) and to continue to position lockup valve 96 in lockup position to continue to engage lockup clutch 46 for 5th lockup drive (line 5LU—5LU, FIG. 4).

TABLE III, and the FIG. 4 heavy lines and curves plotted relative to engine speed and output speed, show the overall drive speed ratios and shifts provided by the preferred first embodiment for full-throttle and load operation. It will be seen that the engine speed interval or change of engine speed ($\Delta$Ne Drive, TABLE III) between Min. and Max. engine speeds (Ne) in each range drive is always within the engine working speed range, e.g., 1500-1800 RPM. All upshifts, lockup and range, occur at maximum engine speed. After all upshifts, the minimum engine speed in the next higher gear ratio is slightly above the peak torque engine speed so power loss on a shift causing decreased speed will be counteracted by the resultant increase of engine torque toward peak torque to avoid engine lugging. In the lower output speed portions of 1st, 2nd, and 3rd range drives with wide ratio steps therebetween, the minimum intermediate shaft speed (1Ni, 2Ni, 3Ni) is less than peak torque engine speed, so torque converter drive is used to provide minimum engine speed at or above peak torque engine speed in the engine working speed range. The 1st, 2nd, and 3rd lockup shifts are made at an intermediate shaft speed above peak torque speed so engine speed is not reduced below peak torque engine speed. In 4th and 5th the range drives after 3-4 and 4-5 close ratio steps, the minimum intermediate shaft speed (4Ni and 5Ni) is more than peak torque engine speed, so lockup drive is used. The change of engine speed ($\Delta$Ne) on shifts is quite uniform for smooth shift steps. The transition output speed (e.g., 1170) at which the 3rd converter drive to 3rd lockup drive shift occurs is selected so the higher output speed range (e.g., 1170 to 1800) is the normal continuously used road load driving output speed range with a torque ratio range from 1.37 to 1, and the lower output speed range (e.g., 0 to 1170) is the occasionally used low speed and high torque drive output speed range with a torque ratio range from maximum to 3rd gear ratio, 1.37. The gearing 15 has close 3-4 and 4-5 ratio steps of 20% or less, preferably 17%, so lockup drive can be continuously used for high efficiency and good quality shifts in the high output speed range above the transition speed, and wide 1-2 and 2-3 ratio steps of more than 50% used with torque converter drive for a wide range of torque multiplication and good quality shifts in the low output speed range, with full-throttle engine operation always in the engine working speed range.

OPERATION OF MODIFICATION

The full-throttle and full load operating characteristics of an illustrative example of the modified transmission shown in FIGS. 1 and 3 for a similar highway vehicle are shown in TABLES I and IV and FIG. 5 curves. The type of data in TABLE IV for this modification is the same type of data shown in TABLE III and described above for the first embodiment.

TABLE IV

| Drive Modes & Shifts | Ne Min. | Ne Max. | Ne Drive & Shift | Ni Min. | Ni Max. | No Min. | No Max. | $\Delta$ No Drive |
|---|---|---|---|---|---|---|---|---|
| 1st Conv. | 1500 | 1800 | 300 | -0- | 1600 | -0- | 433 | 433 |
| 1-2 Shift | | | 250 | | | | | |
| 2nd Conv. | 1550 | 1800 | 250 | 925 | 1600 | 433 | 750 | 317 |
| 2-3 Shift | | | 250 | | | | | |
| 3rd Conv. | 1550 | 1800 | 250 | 1025 | 1600 | 750 | 1170 | 420 |
| LU Shift | | | 200 | | | | | |
| 3rd LU | 1600 | 1800 | 200 | 1600 | 1800 | 1170 | 1316 | 146 |
| 3-4 Shift | | | 257 | | | | | |
| 4th LU | 1543 | 1800 | 257 | 1543 | 1800 | 1316 | 1535 | 219 |
| 4-5 Shift | | | 265 | | | | | |
| 5th LU | 1535 | 1800 | 265 | 1535 | 1800 | 1535 | 1800 | 265 |

In FIG. 5 the engine torque Curve 116 and engine working speed range 121 and the 1st to 5th speed ratio lines 1st to 5th for gearing 15 are the same as shown in FIG. 4 and described above. FIG. 5 has the same functional legends as FIG. 4 (e.g., 1C is 1st converter drive).

This modified transmission 8 uses the same torque converter 14, gearing 15, and transmission controls 71, with the automatic range control 75 having lower predetermined upshift speeds, as shown by the maximum output speed (No) in each range in TABLE IV and the modified lockup control 79' shown in FIG. 3. In the modified lockup control 79', the output governor pressure in line 84 controls the lockup shift valve 96' (FIG. 3) to provide only converter drive in 1st and 2nd range drives and converter drive in 3rd range drive up to a lockup or transition output speed (T, FIG. 5), e.g., 1170. The 1st converter drive (TABLE IV; Curve 1C—1C, FIG. 5) is the same as described above for the first embodiment. At the maximum output speed (No, 433), in 1st converter drive, the automatic range controls 75 provide a 1-2 shift (Curve 1C-2C, FIG. 5) for a shift from 1st to 2nd converter drive. This 1-2 shift in gearing 15, at constant output speed, e.g., 433, reduces intermediate shaft 41 speed to 2Ni (FIG. 5) at 925 RPM. The torque converter speed ratio decreases, so the input or engine speed at full load will only be reduced to 1550 RPM to provide full torque converter capacity at the minimum speed in 2nd converter drive. In 2nd converter drive, as engine and output speeds increase in the intervals from the minimum to the maximum (TABLE IV) for drive on Curve 2C—2C (FIG. 5), the overall speed ratio increases from near 1st gear ratio to near 2nd gear ratio due to increasing converter speed ratio. At the maximum output speed (e.g., 750) in 2nd converter drive, the automatic range controls 75 provide a 2-3 shift (Curve 2C-3C) to 3rd converter drive. On the 2-3 shift at constant output speed, intermediate shaft 41 speed is reduced to 3Ni (FIG. 5) at 1025 RPM. Then torque converter 14 has the torque capacity to provide full torque at the minimum engine speed of 1550 MPH.

In 3rd converter drive (Curve 3C—3C, FIG. 5), as engine and output speeds increase (TABLE IV), the overall speed ratio increases from near 2nd gear ratio to near 3rd gear ratio as torque converter torque ratio increases. At the lockup or transition speed (e.g., 1170 RPM), lockup shift valve 96', in response to output governor 76, engages lockup clutch 46 to provide the 3rd converter to lockup shift (Curve 3C-3LU) for 3rd lockup drive (Curve 3LU—3LU), FIG. 5 and TABLE IV. Then, in 3rd lockup drive, at the range upshift output speed (e.g., 1316 RPM) automatic range controls 75 provide a 3-4 range shift (Curve 3LU-4LU) to 4th lockup drive (Curve 4LU—4LU), FIG. 5 and TABLE IV. In 4th lockup drive at 4-5 range upshift output speed (e.g., 1535 RPM), there is a 4-5 upshift (Curve 4LU-5LU) to 5th lockup drive (Curve 5LU—5LU), FIG. 5 and TABLE IV. After the 3-4 and 4-5 shifts, the minimum intermediate shaft speed (TABLE IV and 4Ni, 5Ni, FIG. 5), due to the close ratio steps of 20% or less, especially 17%, is not less than peak torque engine speed and thus in the engine working speed range.

In this modification, as shown by TABLE IV and the FIG. 5 curves, this transmission also provides a plurality (five) of drives having decreasing torque ratios with a large total range of torque multiplication for increasing output speed from 0 (zero) to a maximum, 1800 RPM, and retaining engine speed in a small engine working speed range, e.g., 1500 to 1800 RPM. Torque converter drive and wide gear ratio steps are provided for 65% of the output speed range, from 0 (zero) to 1170 RPM, the low speed ranges up to the transition speed, for smooth shifting. Lockup drive and close ratio steps are provided for maximum efficiency in the high speed, 35% of the output speed range, from 1170 to 1800 RPM above the transition speed in high speed ranges. Thus this modification provides the basic advantages of the preferred embodiment-except lockup is not provided in any portion of the low speed ranges below the transition speed, for smoother or high quality shifts with simplified controls. In both modifications, especially in the high speed range, known lockup cut-off controls and/or trimmer valves may, if desired, be used for optimum shift quality.

The above-described embodiments are illustrative of the invention which may be modified within the scope of the appended claims.

The embodiments of the invention in which an exclusive property or privilege is claimed are defined as follows:

1. In a transmission for use with an engine having an engine working speed range between the peak torque engine speed and maximum governed engine speed and providing peak torque at peak torque engine speed and substantially peak torque up to maximum governed engine speed; an input adapted to be driven by said engine at engine speed; an intermediate member; an output; a torque converter having a pump driven by said input and a turbine driven by said pump and connected to said intermediate member, said torque converter having a torque capacity permitting stalling of said turbine under full load up to engine peak torque at engine peak torque speed and thereafter up to maximum engine governed speed delivering substantially engine peak torque to said intermediate member; a lockup clutch driven by said input and engageable to provide lockup drive to said intermediate member; gearing means having 1st, 2nd, 3rd, 4th, and 5th range drives with progressively decreasing gear ratios between said intermediate member and said output with wide 1-2 and 2-3 ratio steps and close 3-4 and 4-5 ratio steps, each of said first and said second and said third range drives having a maximum speed of said output corresponding to said maximum engine governed speed while the speed of said intermediate member is said second and said third range drives at upshifts from respective ones of said first and said second range drives occurring at said maximum speed of said output corresponds to engine speeds below said peak torque engine speed, each of said fourth and said fifth range drives having a maximum speed of said output corresponding to said maximum engine governed speed while the speed of said intermediate member in said fourth and said fifth range drives at upshifts from respective ones of said third and said fourth range drives occurring at said maximum speed of said output corresponds to engine speeds within said working speed range, automatic range control means operative during full-throttle operation to upshift said gearing means from each lower range drive to the next higher range drive at said maximum speed of said output in the corresponding lower range drive; and lockup control means operative during full throttle operation in response to the speed of one of said intermediate member and said output to disengage said lockup clutch for torque converter drive whenever in said first range drive the speed of said intermediate member corresponds to an engine speed below said peak torque engine speed and whenever an upshift from each of said first and said second range drives to respective ones of said second and said third range drives results in a speed of said intermediate member corresponding to an engine speed below said peak torque engine speed and to engage said clutch for lockup drive whenever said gear means is in each of said fourth and said fifth range drives and in said third range drive whenever the speed of said intermediate member corresponds to an engine speed in said working speed range.

2. The invention defined in claim 1, and said wide ratio steps being greater than 50% ratio steps and said close ratio steps being 20% or less.

3. In a transmission for use with an engine having an engine working speed range between the peak torque engine speed and maximum governed engine speed and providing peak torque at peak torque engine speed and substantially peak torque up to maximum governed engine speed; an input adapted to be driven by said engine at engine speed; an intermediate member; an output; a torque converter having a pump driven by said input and a turbine driven by said pump and connected to said intermediate member, said torque converter having a torque capacity permitting stalling of said turbine under full load up to engine peak torque at engine peak torque speed and thereafter up to maximum engine governed speed delivering substantially engine peak torque to said intermediate member; a lockup clutch driven by said input and engageable to provide lockup drive to said intermediate member; gearing means having 1st, 2nd, 3rd, 4th, and 5th range drives with progressively decreasing gear ratios between said intermediate member and said output with wide 1-2 and 2-3 ratio steps and close 3-4 and 4-5 ratio steps, each of said first and said second and said third range drives having a maximum speed of said output corresponding to said maximum engine governed speed while the speed of said intermediate member in said second and said third ranges drives at upshifts from respective ones of said first and said second range drives occurring at said maximum speed of said output corresponds to engine speeds below said peak torque engine speed, each of said fourth and said fifth range drives having a maximum speed of said output corresponding to said maximum engine governed speed while the speed of said intermediate member in said fourth and said fifth range drives at upshifts from respective ones of said third and said fourth range drives occurring at said maximum speed of said output corresponds to engine speeds within said working speed range, automatic range control means operative during full-throttle operation to upshift said gearing means from each lower range drive to the next higher range drive at said maximum speed of said output in the corresponding lower range drive; an input governor means responsive to the speed of said intermediate member and operative to generate a control signal proportional to the speed of said intermediate member; and lockup control means connected to said clutch and to said input governor means operative during full throttle operation in said first range drive to disengage said clutch for torque converter drive whenever the speed of said intermediate member corresponds to an engine speed below said peak torque engine speed and to engage said clutch whenever the speed of said intermediate member corresponds to an engine speed within said working speed range and operative during full throttle operation in each of said second and said third range drives to disengage said clutch for torque converter drive whenever an upshift from each of said first and said second range drives to respective ones of said second and said third range drives results in a speed of said intermedite member corresponding to an engine speed below said peak torque engine speed and to engage said clutch whenever the speed of said intermediate member in said second and said third range drives corresponds to an engine speed within said working speed range and operative during full throttle operation in each of said fourth and said fifth range drives to maintain said clutch in continuous engagement so that torque converter drive is excluded in each of said fourth and said fifth range drives.

* * * * *